United States Patent Office 3,492,452
Patented Jan. 27, 1970

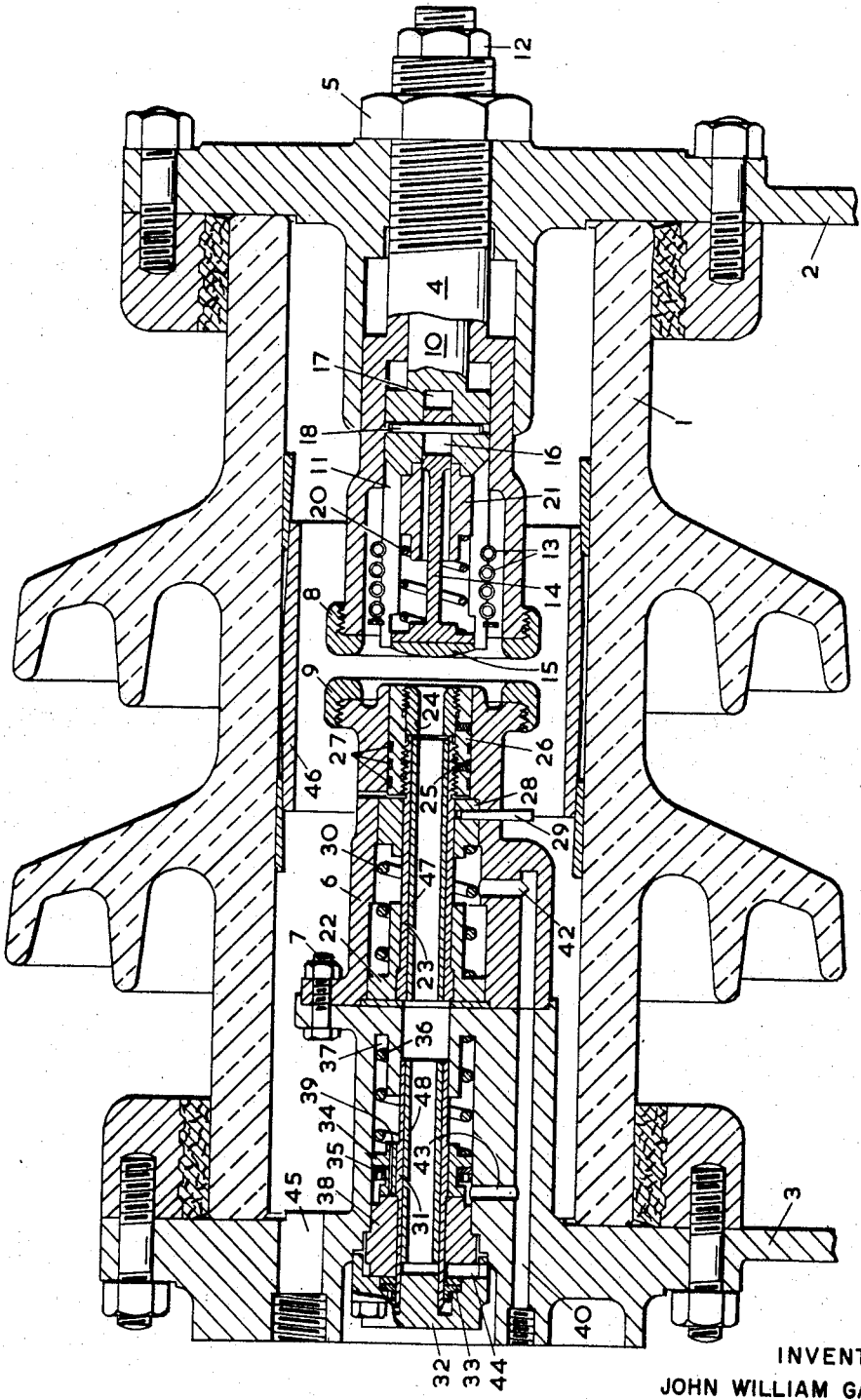
INVENTORS
JOHN WILLIAM GATISS
WILLIAM JOHN JOYCE

3,492,452
PROTECTIVE SWITCHING DEVICES FOR CAPACITORS, WITH MOVABLE CONTACTS WITHIN ARCING ELECTRODES AND EXHAUST VALVE MEANS
John William Gatiss and William John Joyce, Stafford, England, assignors to The English Electric Company Limited and British Insulated Callender's Cable Limited, both of London, England, and both British companies
Filed Sept. 27, 1966, Ser. No. 582,293
Claims priority, application Great Britain, Sept. 27, 1965, 40,947/65
Int. Cl. H01h *33/82*
U.S. Cl. 200—148         3 Claims

ABSTRACT OF THE DISCLOSURE

A capacitor-protection switching device comprising a pressurised casing having two electrodes which define a spark gap between them and two coaxial contacts relatively movable into contact with one another to bridge the spark gap upon breakdown and subsequently movable out of contact. An exhaust passage is created for the pressurized gas in response to the separation of the contacts whereby to extinguish any arc drawn between these contacts during this movement.

---

This invention relates to protective switching devices, and particularly, but not exclusively, relates to switching devices for protecting capacitors connected in series with high voltage transmission lines.

Such capacitors are connected in series with the high voltage line to compensate for the inductance possessed by the line thereby to improve the power factor, reduce the losses and, in the case of two parallel lines, ensure correct current sharing. They may also be used to improve system stability when long lines are involved. These capacitors are conveniently mounted on insulators in banks, one bank per phase.

However, since these capacitors are connected in series with the line they are liable to be damaged by any fault current which may flow, the voltage developed across these capacitors being directly proportional to the current. Accordingly, these capacitors must be protected and this is effected by switching devices which can effectively switch them out of circuit upon the occurrence of a fault current in excess of a predetermined magnitude.

In general, it is economical to use capacitors which will safely withstand voltages up to three times their normal rating for a short while and to provide switching devices which will by-pass the capacitors if the fault persists or if the voltage rises to a higher value.

When a fault condition is manifested the fault current will continue to flow until a circuit breaker interrupts the line and isolates the fault. Now if the fault should be on the load side of the line concerned, i.e. in one of the feeders, the circuit breaker associated with that feeder will open and the line would again be carrying the normal load current, and in this event it is normally desirable for the capacitors to be rapidly reconnected in circuit, e.g. within about 2 cycles in a system operating at 50 or 60 cycles per second.

Thus, is a typical 400 kv. line the sort of values which might apply are as follows. The line be rated at 1000 amps R.M.S., the normal voltage across each capacitor may be 40 kv. and a fault current of 7500 amps R.M.S., may be expected. The switching device should therefore be set to breakdown at 120 kv. and be capable of carrying 7500 amps for at least 5 cycles, by which time the circuit breaker should have operated, and to recover within about 2 cycles when the fault has been isolated.

From one aspect, the present invention consists in a switching device comprising a casing having therein first and second electrodes defining therebetween a spark gap adapted to breakdown upon a voltage developed thereacross exceeding a predetermined magnitude, two contacts relatively movable into engagement with one another to bridge the spark gap upon breakdown thereof and movable out of engagement with one another upon the current therethrough subsequently falling below a predetermined magnitude, the casing being adapted to be pressurised with a gas and affording an exhaust passage for said gas in response to movement of the contacts out of engagement with one another whereby to extinguish any arc drawn between said contacts during said movement.

Preferably, the first and second contacts lie along the axis of the casing, said first and second electrodes being substantially cylindrical in form and each surrounding one of said contacts.

One of the contacts is preferably in the form of a hollow cylinder which defines part of the exhaust path for said gas under the conditions referred to above.

In order that the invention may be fully understood, one embodiment thereof will now be described with reference to the accompanying drawing which illustrates an axial section through a switching device according to this invention.

Briefly, this device combines two switches in one casing, the first switch being a spark gap which is designed to break down upon a predetermined voltage being developed across the capacitor which it is protecting, and the second switch comprising a pair of moving contacts which close so as to bridge the spark gap. The casing is pressurised so that the air blast principle is employed to extinguish the arc drawn between the moving contacts when they open, and a control valve which governs the pressure in two operating cylinders within the casing is operated through a relay which is energised by the current flowing through the device when the spark gap breaks down.

Referring now more particularly to the drawing, the casing comprises a cylindrical porcelain body 1 having two flanged metal terminal plates 2 and 3 at its ends. A cylindrical electrode 4 is supported coaxially within the terminal plate 2, this electrode being screw-threaded into the rear end of the terminal plate 2, so as to be movable axially upon rotation, and carrying a lock nut 5. Similarly, a cylindrical electrode 6 is mounted coaxially with the electrode 4 and spaced a short distance therefrom, this electrode being rigidly mounted on the terminal plate 3, however, by a number of bolts 7, only one of which is shown.

The two electrodes 4 and 6 carry arc resistant, e.g. graphite, rings 8 and 9, respectively, which face one another across the gap defined between the two electrodes.

The electrode 4 has mounted coaxially within it a shaft 10 which has a number of contact fingers 11 extending forwardly from its inner end. This shaft is screw-threaded into the outer end of the electrode 4 so as to be movable axially, upon rotation, within this electrode, and carries a lock nut 12. The figures 11 carry a number of circular coil springs 13 which surround and engage the outer surfaces of the fingers so that they lightly grip between them a spindle 14 which carries an arching contact 15 at its inner end. The other end of the spindle 14 has a slot 16 formed therein and is movable within a bore 17 formed in the shaft 10 within limits defined by the slot 16 and a retaining pin 18 which traverses the slot and is secured in the shaft.

The arcing contact 15 and its spindle 14 are biased inwardly by a compression spring 20 which lies between a shoulder formed on the spindle and a collar 21 secured against the inner end of the shaft 10 by this spring.

The electrode 6 carries within it a composite movable sleeve comprising a member 22 which is secured to a first sleeve 23 the inner end of which is screwed into a second sleeve 26 and abuts an arcing contact 24. This contact is also screwed into the sleeve 26, and both the sleeve 23 and the contact 24 are additionally secured to the sleeve 26 by grub screws 25. The sleeve 26 is mounted for movement within the electrode 6 and makes good electrical contact therewith through a number of current collector rings 27. A collar 28 is secured to this electrode by a pin 29 and engages the surface of the first sleeve 23 and a compression spring 30 extends between this collar and the member 22 so as to bias the contact 24 and its associated composite sleeve away from contact 15.

The terminal 3 similarly carries within it a movable coaxial sleeve 31. This sleeve engages at one end an end plate 32 which carries a seal 33, and engages an internal wall of the terminal 3 at the other end. In addition, the sleeve carries a collar 34 and a circular seal 35 of U-shaped cross-section, a compression spring 36 being mounted between a recessed portion 37 of the terminal 3 and this collar 34 so as normally to cause this collar to abut a ring-shaped member 38 coaxially located between the sleeve 31 and the terminal 3.

A bore 39 extends through the collar 34.

Further, a bore 40 extends in common through the terminal plate 3 and the electrode 6. This bore communicates with either a high pressure source or atmospheric air in dependence on the operation of a relay-controlled valve (not shown) and terminates in the electrode in a branch bore 42 which communicates with the chamber defined between the inner walls of this electrode and the sleeve 23. A further branch bore 43 communicates with the chamber defined between the terminal plate 3 and the composite sleeve.

In addition, a bore 44 extends in common through the outer end of the member 38 and the end plate 32 through which it communicates with atmospheric air, and a further bore 45 in the terminal plate 3 connects the interior chamber of the device with the high pressure source.

In addition to the above-mentioned components in the switching device, three shielding sleeves are employed for protecting parts of the device from the affects of the arc struck across the spark gap and the hot particles carried away during the extinction of the arc struck when the contacts 15 and 14 are opened. One of these sleeves 46 surrounds the graphite rings 8 and 9 and lies adjacent the inner wall of the porcelain body 1, and the other sleeves 47 and 48 lie coaxially within the sleeves 23 and 31, respectively. Each of these protective sleeves may be made from glass-fibre, quartz or other refractory material.

In describing the operation of the switching device, it will be assumed that the components of the device are initially in the positions shown in the drawing, with the bore 45 connected to the source of high pressure and and the bore 40 connected to this source through the relay controlled valve (not shown).

The terminal plates 2 and 3 are connected directly across the capacitor being protected and should the voltage across the capacitor rise upon the occurrence of a fault to a predetermined value, e.g., 120 kv. as mentioned above, then the spark gap will break down and an arc will be drawn between the graphite rings 8 and 9. The resulting current flowing through the line energises the relay controlling the valve so as to exhaust the bore 40 to atmospheric air. A pressure differential is therefore developed across the sleeve 23 and the compressed air acting on the outer left-hand end of the sleeve forces this sleeve, in the manner of a piston, inwardly against the restoring action of the spring 30, thus closing the contact 24 and sleeve 26 onto the contact 15 and the fingers 11, respectively, and short-circuiting the arc. The inward travel of the sleeve 23 is limited by the abutment of the member 22 onto the collar 28, but the permitted travel is sufficient to cause the contact 24 to depress the contact 15 against the restoring action of the spring 20 and permit the sleeve 26 to engage the fingers 11. At the same time, compressed air in the chamber bounded by the inner walls of the terminal plate 3 and the sleeve 31 is exhausted past the collar 34 and the U-shaped seal 35.

When the fault current ceases to flow, the current through the line falls and as a result the relay controls the valve so as to reconnect the bore 40 to the pressure source. The pressure differential across the sleeve 23 is thereby reduced and this sleeve moves back into its position shown under the restoring action of the spring 30, breaking the contacts 15 and 24. At the same time, a pressure differential is established across the collar 34 thus causing this collar, together with the sleeve 31, to move towards the right against the restoring action of the spring 36. This movement results in the bore 44 being exposed whereby the high pressure air within the chamber is exhausted as a gas blast through the breaking contacts, thus extinguishing the arc drawn between these contacts upon opening.

Subsequently, the pressure differential across the collar 34 is reduced by reason of the compressed air bleeding through the bore 39, whereupon this collar together with the sleeve 31 returns to the position shown, realising again the original conditions.

The cycle of events is thus:

(i) Breakdown of the spark gap instantaneously with the voltage across the capacitor attaining the predetermined value indicative of a fault;

(ii) Closure of the contacts to short-circuit the arc and relieve the graphite rings; and (iii) Interruption of the contacts upon the cessation of fault current together with the momentary exhaustion of the chamber to atmosphere to realise a gas blast for arc extinction.

The relay controlling the valve is adapted to sense the cessation of fault current within about one cycle so as to ensure that the switching device is rapidly opened and the capacitor again rendered operative in the transmission line.

This relay may conveniently be coupled to the line through a current transformer.

In addition, in order to protect the capacitor from overheating upon the occurrence of a persistent overcurrent which is nevertheless of insufficient magnitude to cause the voltage across the capacitor to rise to the predetermined value, an inverse time overcurrent relay may also be coupled to the line for controlling the valve mentioned above. In this case, the contacts 15 and 24 close, and the sleeve 26 engages the fingers 11, without the spark gap having first broken down. Similarly, a further relay, directly operative on the latter valve, may be provided for operating in the event of the line current falling below a predetermined value, e.g. 33% of the normal value, and yet another relay may be provided for closing the contacts in the event of the pressure source failing.

An interphase switching mechanism may also be provided to cover cases in which an overcurrent is permitted to flow in the line for a comparatively long period, the switching mechanism being employed to short out the capacitors in all phases of the system in order to conserve balance and stability. This switching mechanism may conveniently be of the form shown in FIGURE 2 in our co-pending patent application No. 582,301, bearing the title "Improvements in and Relating to Control Circuits for Protective Switching Devices."

The design of the switching device according to this invention affords a considerable reduction in overall size in comparison with previous devices employed for this purpose. Furthermore, the chamber within the housing of the device is continually under a high pressure, thus permitting a comparatively small separation between the spark gap electrodes and between the relatively movable contacts which results in a shorter closing time being realised than has been possible before. In addition, the compressed air in the vicinity of the spark gap is automatically replenished following the gas blast extinguishing the arc drawn between the contacts when they open.

By virtue of the selection of a large inlet and small nozzle sizes the pressure within the main chamber of the device varies little during operation.

We claim:

1. A switching device comprising
    a gas-pressurised casing,
    first and second electrodes mounted within the casing and defining therebetween a spark gap adapted to breakdown upon a voltage developed thereacross exceeding a predetermined magnitude,
    two contacts mounted within, and embraced by, the first and second electrodes, respectively,
    resilient means for resiliently mounting one of these contacts, and
    control means for moving the other contact into engagement with the one contact, to bridge the spark gap, and out of engagement therewith upon the current through the contacts subsequently falling below a pre-determined magnitude, said other contact being constructed as a hollow cylinder and having an end face remote from its contact-making surface,
    means defining an exhaust passage for said gas within the casing, the said passage, being exposed upon movement of the contacts out of engagement with one another whereby to extinguish any arc drawn between the contacts during said movement, and being defined by both,
    a fixed member secured to said second electrode, and the cylindrical surface of said other contact, and wherein
        (a) said second electrode and the said other contact define therebetween a first cavity,
        (b) said second electrode alone defines a channel communicating with said cavity and which is selectively vented to atmosphere in a first mode of operation and connected to a high pressure source in a second mode whereby, in said first mode said other contact moves into engagement with said one contact in response to a pressure differential between the first cavity and said end face of the other contact, and
        (c) a spring member is disposed in said first cavity and is operative to apply a restoring force to said other contact whereby, in said second mode of operation, the other contact is disengaged from said one contact under the action of the restoring force, the device further including
    a hollow cylindrical valve embraced by said fixed member,
    a sleeve carried by said valve whereby to define second and third cavities on opposite sides of said sleeve, and
    means defining a bore interconnecting said second cavity with the said channel whereby, in the second mode of operation, said cylindrical valve moves in response to a pressure differential between the second and third cavities and exposes the exhaust passage to exhaust the gas through the said other contact and the cylindrical valve.

2. A switching device according to claim 1, comprising
    a further spring member disposed in said third cavity and operative to apply a restoring force to the cylindrical valve, said sleeve carried by the valve defining a pressure bleed bore extending therethrough whereby, following the exposure of the exhaust passage in the second mode of operation, said cylindrical valve seals the passage in response to the reduction in the pressure differential by the gas bled through said bleed bore and under the action of the restoring force of the further spring member.

3. A switching device comprising
    a gas-pressurised casing,
    first and second electrodes mounted within the casing and terminated by arc-resistant rings defining therebetween a spark gap exposed in said gas and adapted to breakdown upon a voltage developed thereacross exceeding a predetermined magnitude,
    two contacts mounted within, and embraced by, the first and second electrodes, respectively, said contacts having exposed faces lying substantially in alignment with said rings,
    resilient means for resiliently mounting one of these contacts, and
    control means for moving the other contact into engagement with the one contact, to bridge the spark gap, and out of engagement therewith upon the current through the contacts subsequently falling below a predetermined magnitude, said other contact being constructed as a hollow cylinder and having an end face remote from its contact-making surface,
    means defining an exhaust passage for said gas within the casing, the said passage being exposed upon movement of the contacts out of engagement with one another whereby to extinguish any arc drawn between the contacts during said movement, and being defined by both
    a fixed member secured to said second electrode, and the cylindrical surface of said other contact, and wherein
        (a) said second electrode and the said other contact define therebetween a first cavity of annular form,
        (b) said second electrode alone defines a channel communicating with said cavity and which is selectively vented to atmosphere in a first mode of operation and connected to a high pressure source in a second mode whereby, in said first mode said other contact moves into engagement with said one contact in response to a pressure differential between the first cavity and said end face of the other contact, and
        (c) a spring member is disposed in said first cavity and is operative to apply a restoring force to said other contact whereby, in said second mode of operation, the other contact is disengaged from said one contact under the action of the restoring force.

References Cited

UNITED STATES PATENTS

| | | |
|---|---|---|
| 2,323,702 | 7/1943 | Berkey. |
| 2,678,984 | 5/1954 | Ramrath _____ 200—148 |
| 2,760,121 | 8/1956 | Roth. |
| 2,902,570 | 9/1959 | Roxburgh et al. ____ 317—11 X |
| 3,261,954 | 7/1966 | Yonkers. |
| 3,385,941 | 5/1968 | Marbury _____ 200—148 |
| 3,251,970 | 5/1966 | Gonek et al. |

ROBERT K. SCHAEFER, Primary Examiner

ROBERT A. VANDERHYE, Assistant Examiner

U.S. Cl. X.R.

317—12, 65